United States Patent
Staudinger et al.

(10) Patent No.: US 9,848,032 B2
(45) Date of Patent: Dec. 19, 2017

(54) METHOD AND APPARATUS FOR STREAMING METADATA BETWEEN DEVICES USING JAVASCRIPT AND HTML5

(75) Inventors: Robert Staudinger, Freilassing (DE); Claudio Ochoa, Cordoba (AR); Victor Szilagyi, London (GB); Stanley Mo, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 123 days.

(21) Appl. No.: 13/992,420

(22) PCT Filed: Dec. 28, 2011

(86) PCT No.: PCT/US2011/067597
§ 371 (c)(1),
(2), (4) Date: Sep. 26, 2014

(87) PCT Pub. No.: WO2013/100969
PCT Pub. Date: Jul. 4, 2013

(65) Prior Publication Data
US 2015/0052219 A1   Feb. 19, 2015

(51) Int. Cl.
*G06F 15/16* (2006.01)
*H04L 29/08* (2006.01)
(Continued)

(52) U.S. Cl.
CPC .......... *H04L 67/06* (2013.01); *G06F 9/45529* (2013.01); *G06F 9/54* (2013.01);
(Continued)

(58) Field of Classification Search
CPC ....... H04L 29/08; H04L 67/06; H04L 65/607; H04L 67/02; G06F 9/54; G06F 9/45529; G06F 2209/541
See application file for complete search history.

(56) References Cited

U.S. PATENT DOCUMENTS

| 8,676,995 B1 * | 3/2014 | Andreasen ......... H04N 21/4227 340/4.11 |
| 2005/0162551 A1 * | 7/2005 | Baker .................. H04N 7/0885 348/468 |

(Continued)

FOREIGN PATENT DOCUMENTS

| CN | 1987851 A | 6/2007 |
| CN | 101763432 A | 6/2010 |
| CN | 101860734 A | 10/2010 |

OTHER PUBLICATIONS

"International Application Serial No. PCT/US2011/067597, Search Report dated Sep. 27, 2012", 3 pgs.

(Continued)

*Primary Examiner* — Benjamin M Thieu
(74) *Attorney, Agent, or Firm* — Schwegman Lundberg & Woessner, P.A.

(57) ABSTRACT

Techniques and configurations for streaming metadata between devices are disclosed herein. In one example embodiment, streaming textual data, for example subtitles or closed caption data, are provided from a consumer television or set top box (STB) platform to a tablet computer platform. XMPP and BOSH are used as infrastructural components to help establish the client/server connection between the platforms. These components also maintain this connection and support real-time communications and transfer of data between the platforms. In an example embodiment, an application on the primary platform has a string of metadata which is communicated to a client application on a second platform. For example, client application may be a smart phone app in the form of an HTML5 app running on browser. The system may stream and control bi-directionally. In this architecture an XMPP-implementing JavaScript library allows XMPP client interaction through an XML stanza.

28 Claims, 3 Drawing Sheets

US 9,848,032 B2

Page 2

(51) Int. Cl.
G06F 9/455 (2006.01)
G06F 9/54 (2006.01)
H04L 29/06 (2006.01)
(52) U.S. Cl.
CPC ............ *H04L 65/607* (2013.01); *H04L 67/02* (2013.01); *G06F 2209/541* (2013.01)

(56) References Cited

U.S. PATENT DOCUMENTS

| | | | | |
|---|---|---|---|---|
| 2006/0215991 | A1* | 9/2006 | Larson | H04N 5/782 386/212 |
| 2007/0154171 | A1* | 7/2007 | Elcock | H04N 9/8205 386/230 |
| 2007/0276864 | A1* | 11/2007 | Espelien | H04N 7/173 |
| 2008/0193100 | A1* | 8/2008 | Baum | H04N 21/4825 386/281 |
| 2009/0328063 | A1* | 12/2009 | Corvera | G06F 9/54 719/315 |
| 2010/0262650 | A1 | 10/2010 | Chauhan et al. | |
| 2011/0307933 | A1 | 12/2011 | Gavita et al. | |
| 2012/0005702 | A1* | 1/2012 | Tindell | H04N 5/445 725/14 |
| 2012/0079066 | A1* | 3/2012 | Li | H04L 67/26 709/217 |
| 2012/0174157 | A1* | 7/2012 | Stinson, III | H04N 5/44543 725/40 |
| 2012/0210247 | A1* | 8/2012 | Khouri | G06Q 10/101 715/751 |
| 2012/0254362 | A1* | 10/2012 | Li | H04W 4/025 709/218 |
| 2012/0291059 | A1* | 11/2012 | Roberts | H04N 21/41407 725/25 |
| 2012/0294352 | A1* | 11/2012 | Koum | H04N 21/234309 375/240.01 |
| 2013/0013704 | A1* | 1/2013 | Pope | H04L 61/1541 709/206 |
| 2013/0291059 | A1* | 10/2013 | Giambiagi | H04L 63/20 726/1 |
| 2014/0089985 | A1* | 3/2014 | Kawakita | H04H 20/28 725/53 |
| 2014/0106799 | A1* | 4/2014 | Audenaert | G06Q 10/107 455/466 |
| 2015/0236905 | A1* | 8/2015 | Bellan | H04L 41/0806 709/222 |

OTHER PUBLICATIONS

"International Application Serial No. PCT/US2011/067597, Written Opinion dated Sep. 27, 2012", 5 pgs.
Davids, Carol, et al., "SIP APIs for voice and video communications on the web", IPTcomm '11 Proceedings of the 5th International Conference on Principles, Systems and Applications of IP Telecommunications, (Aug. 2, 2011), 7 pgs.
Goergen, Daniel, et al., "A Session Model for Cross-Domain Interactive Multi-User IPTV", 2010 7th IEEE Consumer Communications and Networking Conference (CCNC), (Jan. 12, 2010), 1-6.
"European Application Serial No. 11878678.9, Extended European Search Report dated Jul. 23, 2015", 6 pgs.
"International Application Serial No. PCT/US2011/067597, International Preliminary Report on Patentability dated Jul. 10, 2014", 7 pgs.
"Strophe—libraries for XMPP poets", Retrieved from the Internet: <URL:https7/web.archive.org/web/20111210014417/http://strophe.im/> [retrieved on Jul. 15, 2015], (Dec. 10, 2011), 1 pg.
"Strophe.js documentation", Retrieved from the Internet: <URL:https://web.archive.org/web/20110824163925/http://strophe.im/strophejs/doc/1.0.1/files/core-js.html> [retrieved on Jul. 15, 2015], (Aug. 24, 2011), 1-23.
"Taiwanese Application Serial No. 101148118, Office Action dated Jan. 5, 2015", W/ English Translation, 18 pgs.
"Taiwanese Application Serial No. 101148118, Response filed Apr. 1, 2015 to Office Action dated Jan. 5, 2015", W/ English Claims, 14 pgs.
Lubke, R, "Ein Framework zur Entwicklung mobiler Social Software auf Basis von Android", Diplomarbeit, Technische Universität Dresden—Fakultät Informatik, Institut für Systemarchitektur, Professur für Rechnernetze, Retrieved from the Internet: <URL:http://www.rn.inf.tu-dresden.de/uploads/Studentische_Arbeiten/Diplomarbeit_L%C3%BCbke_Robert.pdf>[retrieved on Sep. 27, 2012], (Mar. 15, 2011), I-V,1.
Lubke, Robert, et al., "A framework for the development of mobile social software on Android", Mobile Computing, Applications, and Services, (2012), 207-225.
"Chinese Application Serial No. 201180075985.9, Office Action dated Apr. 5, 2016", 43 pgs w/ English Translation.
"European Application Serial No. 11878678.9, Response filed Feb. 22, 2016 to Extended European Search Report dated Jul. 23, 2015", (English Translation of Claims), 14 pgs.
M, David, "HTML5 JavaScript Model", Html5, (Dec. 31, 2010), 209-240.
"Chinese Application Serial No. 201180075985.9, Response filed Oct. 23, 2013 to Office Action dated Sep. 2, 2016", not in English, 6 pgs.
"Chinese Application Serial No. 201180075985.9, Office Action dated Feb. 22, 2017", w/ English Translation, 8 pgs.
"Chinese Application Serial No. 201180075985.9, Response filed Apr. 13, 2017 to Office Action dated Feb. 22, 2017", w/ claims in English, 16 pgs.
"Chinese Application Serial No. 201180075985.9, Office Action dated Jul. 11, 2017", w/ English translation, 12 pgs.

* cited by examiner

METHOD AND APPARATUS FOR STREAMING METADATA BETWEEN DEVICES USING JAVASCRIPT AND HTML5

PRIORITY APPLICATION

This application is a U.S. National Stage Application under 35 U.S.C. 371 from International Application No. PCT/US2011/067597, filed Dec. 28, 2011, which is hereby incorporated by reference in its entirety.

TECHNICAL FIELD

The present technology relates generally to the field of computing, and more particularly to systems and methods for communicating data between devices.

BACKGROUND

Applications and web services that wish to interact with other applications on other platforms have few choices to communicate easily. Issues exist when attempting to connect devices and applications in an open and standards-based manner, rather than with use of proprietary technologies. Another important consideration is the structure and syntax for how applications will communicate with each other once they have been connected.

Developers are increasingly using many development models based on the Internet; for example using HTML5, JavaScript Object Notation (JSON), and Cascading Style Sheets (CSS)-based technologies in local applications, web pages, and web applications ("web apps"). In addition to communications among local applications, there is a need for support of web apps and services on various types of classic and lightweight devices, for example, on consumer electronics.

Often, connection and communication between applications and platforms is handled by creating a proprietary pipe. This means that developers have to create custom protocols and syntax for communication. Although this may be sufficient for a single developer wishing to communicate among his or her own applications, it does not support a broader model for multiple heterogeneous applications to connect and collaborate, nor does it support deployment on lightweight devices. Some approaches such as Digital Living Network Alliance (DLNA) communication technologies provide a standards-based means of connecting platforms and identifying some types of media, but do not provide a general purpose mechanism for a broader set of applications to communicate and operate.

DETAILED DESCRIPTION

Figure 1:
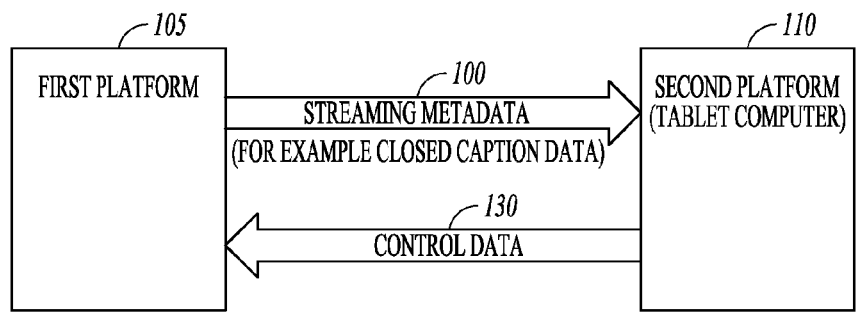
FIG. 1 illustrates a communication link between a first platform providing an XMPP server and a second platform providing a client web application according to an example embodiment.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Described herein is a system and method for discovering and establishing a communications link between platforms or devices, for example a server hosted on a first platform and a web-based application ("web app") operating on a second platform. More particularly, as described below in more detail with respect to FIG. 1, in one example embodiment, there is provided a technique which allows for discovering and establishing a communications link between a first platform hosting an Extensible Messaging and Presence Protocol (XMPP) server, and an HTML5/JavaScript-based web app on a second platform. Within this standards-based framework, streaming metadata is moved in real-time across these platforms using XMPP communications. In one example implementation, an EMCAScript-standard (e.g., JavaScript/JScript) scripting library implementing XMPP functionality and Bidirectional-streams Over Synchronous HyperText Transport Protocol (HTTP) (BOSH) is used as one of the infrastructural components to help establish the client/server connection between the platforms.

As referred to herein, HTML5 is a markup language standard for structuring and presenting content for the World Wide Web. It is the fifth revision of the HTML standard provided by the World Wide Web Consortium (W3C) and as of November 2011 is still under development. HTML5 is intended to subsume not only HTML 4, but XHTML1 and DOM2 HTML (particularly JavaScript/EMCAScript) specifications as well. Many features of HTML5 are provided to enable its use on low-power and lightweight devices such as smart phones and tablets. HTML5 supports a variety of techniques to enable dynamic content presentations, including multimedia display elements (such as video, audio, and graphical animation), application caching, background threading, and integrated scripting support.

As referred to herein, XMPP is an open-standard communications protocol for message-oriented middleware based on XML (Extensible Markup Language). The protocol was originally designed for near-real-time, extensible instant messaging (IM), presence information, and contact list maintenance. Designed to be extensible, the protocol today also finds application in VoIP and file transfer signaling. Unlike most instant messaging protocols, XMPP uses an open systems approach of development and application, by which anyone may implement an XMPP service and interoperate with other organizations' implementations. XMPP-based software and implementations are deployed widely across the Internet, often in free and open source software.

As referred to herein, Bidirectional-streams Over Synchronous HTTP (BOSH) is a transport protocol that emulates a bidirectional stream between two entities (such as a client and a server) by using multiple synchronous HTTP request/response pairs without requiring the use of polling or asynchronous chunking. BOSH is presently a draft standard of the XMPP Standards Foundation. The related standard (XEP-0206) "XMPP over BOSH" defines how BOSH may be used to transport XMPP stanzas. The result is an HTTP binding for XMPP communications that may be used in various situations where a device or client is unable to maintain a long-lived TCP connection to an XMPP server.

As referred to herein, Strophe is a collection of free-licensed libraries used to conduct XMPP communications. Strophe is presently implemented in JavaScript and the C programming language. Strophe (referred to herein as "Strophe.js" or "Strophe JavaScript" for its JavaScript version) provides a JavaScript scripting implementation for use in browser-based clients, using BOSH for communications. Other implementations of XMPP libraries and communication applications may be substituted for the use of Strophe.

According to one example embodiment of the present technology, illustrated in FIG. 1, streaming metadata 100, for example closed caption or subtitle data associated with a video program, is communicated from a first platform 105, for example a consumer set top box (STB), to a second platform 110, for example a tablet computer. The streaming metadata 100 may be communicated, for example, to establish a shared experience on the second platform based on media content being displayed in the first platform. The second platform may be further configured to process this text and obtain contextual information about the media content displayed in the first platform (for example, related content obtained from web sources using keywords extracted from the text with natural language processing).

In one example implementation, described in more detail below, a JavaScript library for implementing XMPP functionality (for example as provided by the Strophe.js library) and BOSH are used as infrastructural components to help establish a client/server connection between the platforms 105 and 110. These components also maintain this connection and support real-time communications and transfer of data between the platforms.

Figure 2:
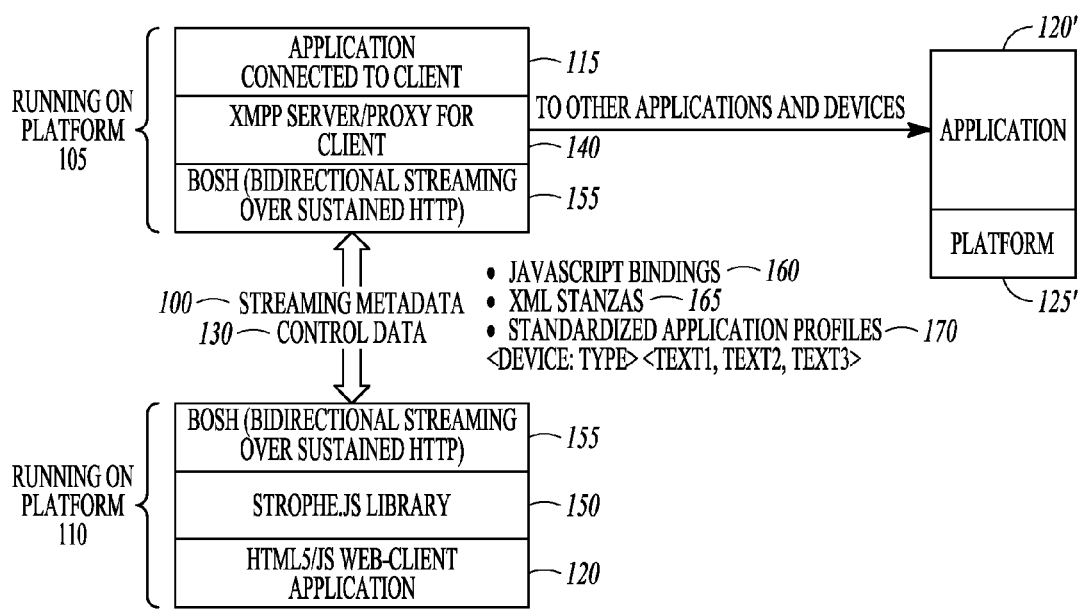
FIG. 2 illustrates a communication architecture of a first platform transmitting textual data and one or more other platforms processing the textual data according to an example embodiment.

As further illustrated in FIG. 2, a server application 115 running on the primary or first platform 105 provides one or more strings within streaming metadata 100, for example in the form of closed captioning or subtitle text, to be communicated to a client application 120 on the second platform 110. Client application 120 may be a smart phone or tablet app implemented by an HTML5/JavaScript (JS) web app running in a browser, for example a browser having a graphical user interface. Along with the streaming metadata 100 being passed in one direction, strings or binary data commands within control data 130 may be sent in the other direction to control flow from the first platform 105, for example to suspend, resume, initiate, or terminate data traffic. This data traffic may occur in real-time and may be reversed or move in both directions simultaneously. Accordingly, the system may stream and control (and exchange commands and data) bi-directionally.

As illustrated in more detail in the example embodiment of FIG. 2, the first platform 105 provides an XMPP server 140 (which, according to additional example embodiments, may reside on a third platform or even in a cloud-based server environment). The client application 120 (in this example an application operating in an HTML5/JS environment) connects to the server application 115 via XMPP server 140, with use of a Strophe.js scripting library 150 and BOSH 155 to create a continuous connection (with JavaScript bindings 160) between the platforms 105, 110.

In this architecture, the JavaScript bindings 160 and Strophe.js scripting library 150 allow XMPP client interaction through exchange of an XML stanza 165. An XML stanza generally is a discrete semantic unit of structured information that is sent from one entity to another over an XML stream. For example, in XMPP, <message/>, <presence/>, and <iq/> are three example XML stanza that are defined for the 'jabber:client' and 'jabber:server' namespaces, used for implementing the Jabber instant messaging protocol). Suitable configurations of XML stanza may be established to include certain data fields in uniform XMPP communications, for example, "<DEVICE:TYPE><TEXTFIELD1,TEXTFIELD2, TEXTFIELD3>". Further for this purpose, application profiles 170 may be developed and provided to define capabilities and structured syntax for the client application 120 and server application 115 to talk to one another. For example, an application profile provided in an XML format using the XML stanza above, such as "<DisplayDevice:Television><Closed_Captioning:Available, Subtitles:Unavailable, Program_Information:Available>" may be used to communicate various characteristics and properties for a particular device and device type. The application profiles 170 are extensible and provide means to export both public and private capabilities and syntax.

The client application 120 receives and processes the textual data in the streaming metadata 100 (closed caption or subtitle text in the present example) being sent from the server application 115 on the first platform 105. According to another example embodiment also illustrated in FIG. 2, the application 120 on the second platform 110 may communicate with another application 120' on a third platform 125'. The third platform 125', in this example, is accessed by the client application 120 through the XMPP server 140, which provides a proxy for the client platform. In an alternative embodiment not illustrated, the third platform 125' may use its application 120' to directly or indirectly communicate with XMPP server 140 (for example, to provide additional textual data or metadata to server application 115).

Figure 3:
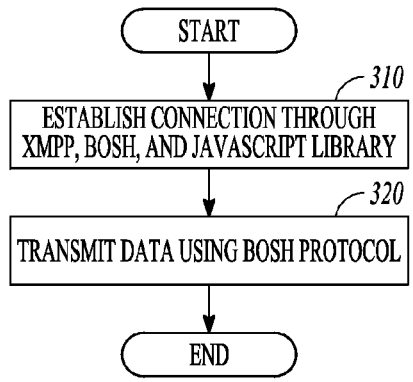
FIG. 3 provides a flowchart illustrating a data flow between platforms according to an example embodiment.

Referring now to FIG. 3, there is illustrated a flowchart demonstrating the flow of data from the first platform 105 to the second platform 110. A client app connects (operation 310) to an XMPP server on a second platform using a JavaScript library implementation of the XMPP and BOSH protocols. Data is transmitted (operation 320) between the platforms using the BOSH protocol. In a further embodiment, the XMPP server and BOSH protocol implementation within the first platform 105 may also be implemented using a JavaScript library implementation.

Using the described architecture, the software footprint and performance requirements on the client (and potentially server) device are reduced to the use of runtime HTML5/JavaScript applications. The applications do not need to be installed as natively-compiled applications, making it easier to deploy and port the applications on a variety of lightweight, low-memory devices. This configuration also decreases the complexity of the network of devices and apps by offering them through a common server platform that may be configured to manage discovery, status, configuration, and like factors. Additionally, this configuration increases the security of the topology with respect to the lightweight device by constraining its functionality as a standalone device, ideal for lesser capable, fixed function devices (like a stereo, DVD player, or like consumer electronics).

Moreover, this architecture also enhances the portability of web-apps by supporting HTML5/JavaScript display techniques in a variety of web pages, web apps, and web browsers using a lightweight and portable XMPP/BOSH plug-in (e.g., Strophe.js), and standardized application-toapplication communication techniques. The present architecture is not limited in the number of platforms which may be interconnected and continuously communicating with one another, even though this example, for the sake of simplicity of illustration, only shows up to three platforms communicating.

In alternate embodiments, the metadata provided in connection with the XMPP communications may include data additional or supplemental to the closed captioning or subtitle text. Text provided within the metadata may relate to video content (such as a television program) but not directly correspond to audio of the video content. For example, if the video content broadcast or streamed to the television is a movie, textual content provided in the XMPP communications may include metadata associated with the movie (provided by the video content source or another external source), such as title, actor/actress listing, keywords, brief content description, and the like. Data fields provided within the metadata may also include data in non-textual forms, such as binary and compressed data. Custom tags, keywords, and other text that is not displayed to the user may also be provided within the metadata.

Returning to a previous example, a television's closed-captioning/subtitle information may be obtained from the television's displayed video content, and transmitted to a client application for real-time processing. The television in this scenario may operate as a server, to transmit a real-time data stream of metadata (containing text) to the client application operating on another device. For instance, the client application may be provided by a web app executing on an internet-connected tablet PC that is operable in the same environment as the television. In such a scenario, the tablet PC may be configured to display a user-operable graphical user interface that enables a user to learn more about the video content being displayed, in connection with contextual information derived from text or other data in the streamed metadata.

According to one example embodiment, any of the above-described elements and functionality, such as but not limited to the client application 120, XMPP server 140, or the Strophe or BOSH components, may be implemented as a combination of one or more modules, as defined further herein below. Further, various methods or techniques, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device.

One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Although certain of the previously described embodiments include the use of internet-based standards such as HTML5 and JavaScript in "web apps" and like browser-based applications, it will be understood that the presently described techniques and system configurations may also be applied in a variety of computing and electronic device settings. For example, any combination of standalone, installed, server-based, or thin-based client software applications may be used to provide functionality and communications with the application models described herein.

Further, a web app or other web-based application does not necessarily require internet connectivity or use of the World Wide Web, as a web-based application may provide functionality within a private local area network to connected devices, or within a single device without network connectivity. Additionally, the use of a web app as described herein is not limited to use of JavaScript and an HTML5-standards based markup language, but other suitable markup and scripting languages and browser/application-interpreted instruction formats may also be used.

As used herein, the term "browser" generally refers to a software application for retrieving, presenting, and traversing an information resource such as a web page or web application, from a local or remote location (for example, via a network or the World Wide Web). A browser may include support for real-time script execution and interpretation in connection with the information resource to be presented. One embodiment of a browser may include a graphical user interface to present the information resource, but other embodiments may provide additional or alternative types of user interfaces. Further, a browser may be configured to perform execution of one or more web applications as a background process without providing a user interface.

Figure 4:
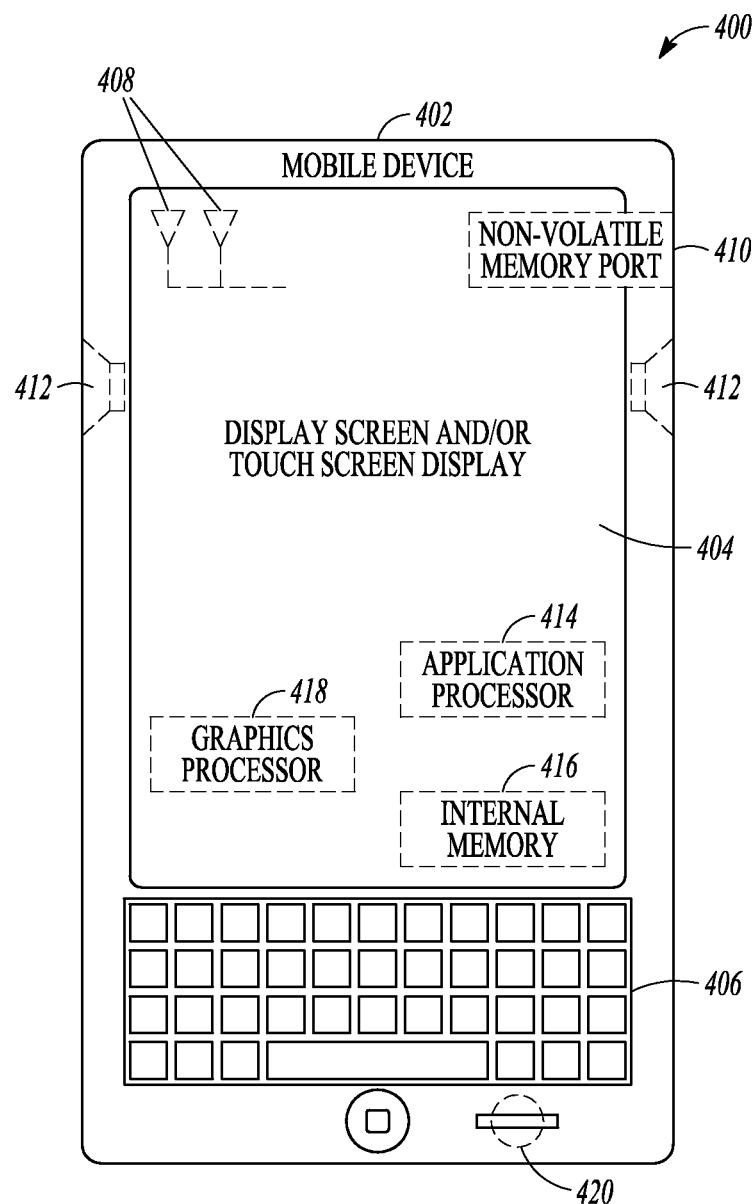
FIG. 4 illustrates a lightweight mobile device configured to operate in accordance with one or more of the described embodiments.

FIG. 4 provides an example illustration 400 of a light-weight or mobile device 402, such as a user equipment (UE), a mobile station (MS), a mobile wireless device, a mobile communication device, a tablet, a handset, or other type of mobile wireless device. The mobile device 402 may include one or more antennas 408 configured to communicate with a base station (BS), an evolved Node B (eNB), or other type of wireless wide area network (WWAN) access point. The mobile device 402 may be configured to communicate using at least one wireless communication standard including 3GPP LTE/LTE-A, WiMAX, High Speed Packet Access (HSPA), Bluetooth, and Wireless Fidelity (Wi-Fi). The mobile device 402 may communicate using separate antennas for each wireless communication standard or shared antennas for multiple wireless communication standards. The mobile device 402 may communicate in a wireless local area network (WLAN), a wireless personal area network (WPAN), and/or a wireless wide area network (WWAN).

FIG. 4 also provides an illustration of a microphone 420 and one or more speakers 412 that may be used for audio input and output from the mobile device 402. The display screen 404 may be a liquid crystal display (LCD) screen, or other type of display screen such as an organic light emitting diode (OLED) display. The display screen 404 may be configured as a touch screen. The touch screen may use capacitive, resistive, or another type of touch screen technology. An application processor 414 and a graphics processor 418 may be coupled to internal memory 416 to provide processing and display capabilities. A non-volatile memory port 410 may also be used to provide data input/output options to a user. The non-volatile memory port 410 may also be used to expand the memory capabilities of the mobile device 402. A keyboard 406 may be integrated with the mobile device 402 or wirelessly connected to the mobile device 402 to provide additional user input. A virtual keyboard may also be provided using the touch screen.

Figure 5:
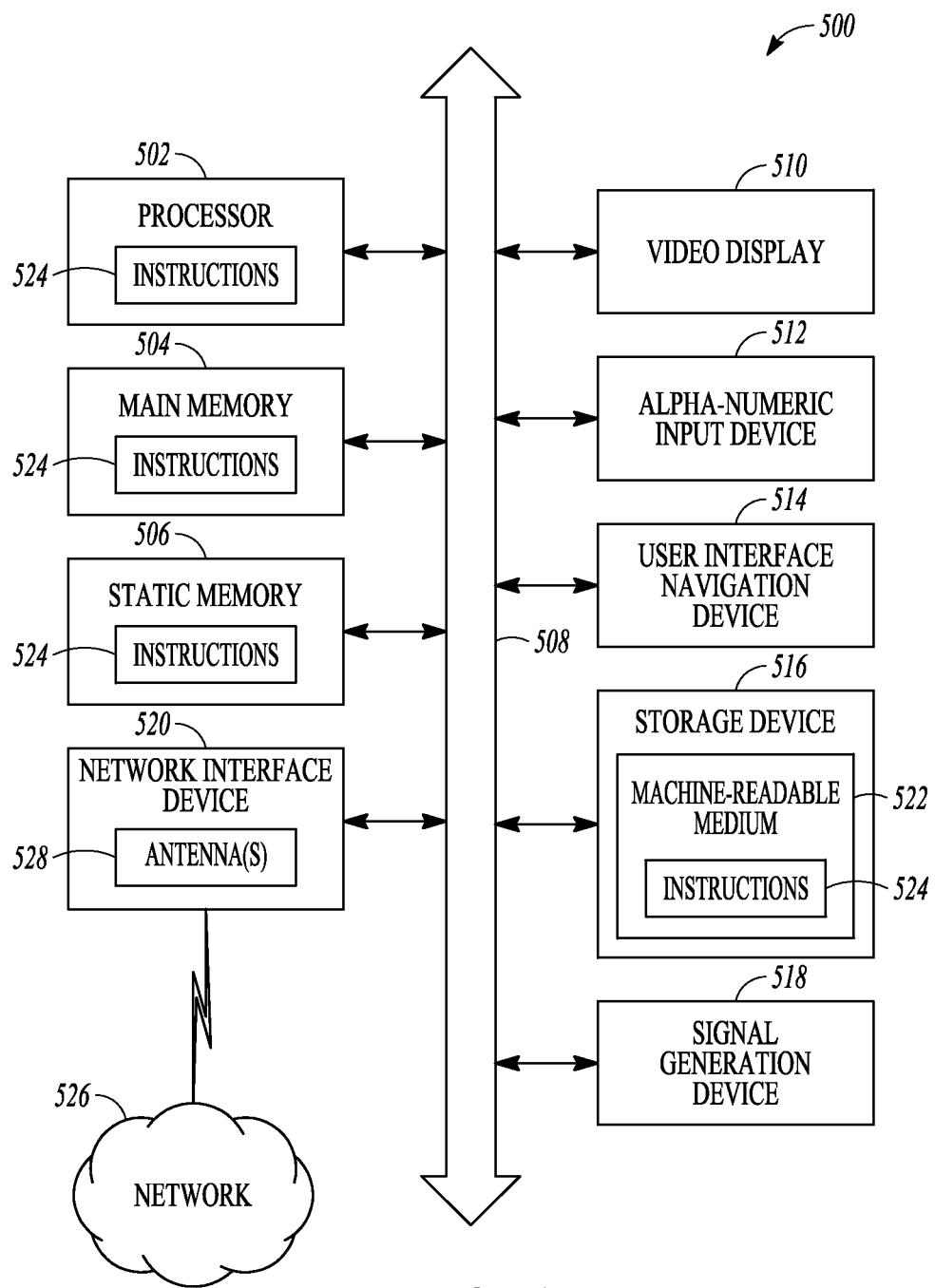
FIG. 5 illustrates a block diagram of an example machine upon which one or more of the described embodiments may be implemented.

FIG. 5 is a block diagram illustrating an example machine upon which any one or more of the methodologies herein discussed may be run. Computer system 500 may be used as the base platform for any of the platforms described above, or for any other computer platform described or referred to herein. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 500 includes a processor 502 (e.g., a central processing unit (CPU), a graphics processing unit (GPU) or both), a main memory 504 and a static memory 506, which communicate with each other via an interconnect 508 (e.g., a link or bus). The computer system 500 may further include a video display unit 510, an alphanumeric input device 512 (e.g., a keyboard), and a user interface (UI) navigation device 514 (e.g., a mouse). In one embodiment, the video display unit 510, input device 512 and UI navigation device 514 are a touch screen display. The computer system 500 may additionally include a storage device 516 (e.g., a drive unit), a signal generation device 518 (e.g., a speaker), a network interface device 520 (which may include or operably communicate with one or more antennas 528, transceivers, or other wireless communications hardware), and one or more sensors (not shown), such as a global positioning system (GPS) sensor, compass, accelerometer, or other sensor.

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, and/or within the processor 502 during execution thereof by the computer system 500, with the main memory 504, static memory 506, and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of well-known transfer protocols (e.g., HTTP). Examples of communication networks include a LAN, WAN, the Internet, mobile telephone networks, Plain Old Telephone (POTS) networks, and wireless data networks (e.g., Wi-Fi, 3G, and 5G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Other applicable network configurations may be included within the scope of the presently described communication networks. Although examples were provided with reference to a local area wireless network configuration and a wide area internet network connection, it will be understood that communications may also be facilitated using any number of personal area networks, local area networks (LANs), and wide area networks (WANs), using any combination of wired or wireless transmission mediums.

The embodiments described above may be implemented in one or a combination of hardware, firmware, and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the base station or the UE may include one or more processors and may be configured with instructions stored on a computer-readable storage device.

It should be understood that the functional units or capabilities described in this specification may have been referred to or labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 includes a client device, comprising: at least one processor; at least one memory device; at least one scripting library executable in the browser and configured to establish one or more Bidirectional-streams Over Sustained HTTP (BOSH) connections between the client device and a server; and at least one web application executable in the browser and configured to implement the scripting library to receive, using the BOSH connections, one or more Extensible Messaging and Presence Protocol (XMPP) data transmissions from the server, wherein the XMPP data transmissions provide a stream of metadata from one or more applications operating on the server; wherein the memory device provides a plurality of instructions stored therein, that when executed by the processor, cause the processor to perform instructions that execute the browser, the at least one scripting library, and the at least one web application.

In Example 2, the subject matter of Example 1 may optionally include transmitting, using the BOSH connections, one or more commands from the web application to the server in one or more XMPP command transmissions, the commands used to control transmission of the stream of metadata from the server to the web application.

In Example 3, the subject matter of one or any combination of Examples 1-2 may optionally include establishing the BOSH connection in the browser using a scripting library executed in the web application, the scripting library providing one or more runtime-executed BOSH connection components to the browser.

In Example 4, the subject matter of one or any combination of Examples 1-3 may optionally include the web application being coded in a browser-renderable markup language compliant with an HTML5 markup language standard, wherein the scripting library is coded in a scripting language compliant with a JavaScript scripting language standard, and wherein the browser graphical user interface is further configured to render web applications coded in a markup language compliant with the HTML5 markup language standard and a scripting language compliant with the JavaScript scripting language standard.

In Example 5, the subject matter of one or any combination of Examples 1-4 may optionally include exchanging with the server, using the BOSH connections, one or more application profiles, the application profiles defining capabilities and structured syntax in an XMPP format for the web application and the application operating on the server.

In Example 6, the subject matter of one or any combination of Examples 1-5 may optionally include communicating with the server using an XML stanza defined for the web application, the XML stanza providing structured syntax for the XMPP data transmissions with the web application.

In Example 7, the subject matter of one or any combination of Examples 1-6 may optionally include the stream of metadata being provided from the application operating on the server is associated with multimedia content, and wherein the metadata includes text from one or more of closed captioning text or subtitle text provided for the multimedia content.

In Example 8 may include, or may optionally be combined with the subject matter of one or any combination of Examples 1-7 to include a server device, comprising: at least one processor; at least one memory device; at least one server application for providing a stream of metadata to one or more client applications at a client device, the server application configured to: establish a bidirectional-streams over sustained HTTP (BOSH) connection between the server application and a client application; and transmit, using the BOSH connection, one or more data transmissions from the server application to the client applications, the data transmissions including XMPP-formatted communications providing the stream of metadata; wherein the memory device provides a plurality of instructions stored therein, that when executed by the processor, cause the processor to perform instructions that execute the server application.

In Example 9, the subject matter of Example 1 may optionally include receiving, using the BOSH connection, one or more commands from the client applications to the server application in one or more XMPP command transmissions, the commands used to control transmission of the metadata to the client applications.

In Example 10, the subject matter of one or any combination of Examples 8-9 may optionally include the server application being provided by one or more web applications or web pages executed in connection with a browser, the web applications or web pages using a markup language compliant with an HTML5 markup language standard and a scripting language compliant with a JavaScript scripting language standard.

In Example 11, the subject matter of one or any combination of Examples 8-10 may optionally include exchanging one or more application profiles with the client applications using the BOSH connection, the application profiles defining capabilities and structured syntax in an XMPP format for the server application and the client applications.

In Example 12, the subject matter of one or any combination of Examples 8-11 may optionally include communicating with the client applications using an XML stanza, the XML stanza providing structured syntax for the XMPP-formatted communications with one or more client applications.

In Example 13, the subject matter of one or any combination of Examples 8-12 may optionally include the stream of metadata provided from the server application being associated with multimedia content processed by the server device, and wherein the metadata includes text from one or more of closed captioning text or subtitle text received at the server device for the multimedia content.

In Example 14 may include, or may optionally be combined with the subject matter of one or any combination of Examples 1-13 to include a method for obtaining a stream of metadata from a remote application, comprising: establishing a bidirectional-streams over sustained HTTP (BOSH) connection between a local web application and a remote application, the local web application executed within a browser; receiving, using the BOSH connection, a Extensible Messaging and Presence Protocol (XMPP) data transmission from the remote application, wherein the XMPP data transmission provides metadata from the remote application for use with the local web application; and extracting, within the local web application, a value from the metadata.

In Example 15, the subject matter of Example 14 may optionally include the BOSH connection being established by the browser through use of a scripting library, the scripting library providing at least one BOSH connection component for runtime execution within the browser.

In Example 16, the subject matter of one or any combination of Examples 14-15 may optionally include the local web application being coded in a browser-renderable markup language compliant with an HTML5 markup language standard, wherein the scripting library is coded in a scripting language compliant with a JavaScript scripting language standard, and wherein the browser is further configured to render web applications coded in a markup language compliant with the HTML5 markup language standard and a scripting language compliant with the JavaScript scripting language standard.

In Example 17, the subject matter of one or any combination of Examples 14-16 may optionally include transmitting, using the BOSH connection, an application profile, the application profile defining capabilities and structured syntax in an XMPP format for the local web application and the remote application; wherein the XMPP data transmission uses a stanza defined in XML format, the stanza providing structured syntax for the XMPP data transmission with the local web application.

In Example 18 may include, or may optionally be combined with the subject matter of one or any combination of Examples 1-17 to include a method for transmitting a stream of metadata to a remote web application, comprising: establishing, at a server, a BOSH Bidirectional-streams Over Sustained HTTP connection between a local application operating at the server and a remote web application, the remote web application executed within a browser; and transmitting from the server, using the BOSH connection, an XMPP Extensible Messaging and Presence Protocol data transmission to the remote web application, wherein the XMPP data transmission provides metadata from the local application to the remote web application.

In Example 19, the subject matter of Example 18 may optionally include the local application being a local web application executed in a local browser and coded in a browser-renderable markup language compliant with an HTML5 markup language standard, wherein the scripting library is coded in a scripting language compliant with a JavaScript scripting language standard, and wherein the local browser is further configured to render web applications coded in a markup language compliant with the HTML5 markup language standard and a scripting language compliant with the JavaScript scripting language standard.

In Example 20, the subject matter of one or any combination of Examples 18-19 may optionally include receiving, using the BOSH connection, an application profile, the application profile defining capabilities and structured syntax in an XMPP format for the local application and the remote web application; wherein the XMPP data transmission uses a stanza defined in XML format, the stanza providing structured syntax for the XMPP data transmission with the remote web application.

In Example 21, the subject matter of one or any combination of Examples 1-20 may optionally include at least one machine readable storage medium comprising a plurality of instructions, that in response to being executed on a computing device, cause the computing device to perform acts or steps in connection with the method or device configurations of Examples 1-20.

In Example 22 may include, or may optionally be combined with the subject matter of one or any combination of Examples 1-21 to include a system comprising: a first platform providing an Extensible Messaging and Presence Protocol (XMPP) server and a server application, the XMPP server configured to communicate using one or more bidirectional-streams over sustained HTTP (BOSH) connections; and a second platform providing an XMPP client and a client application, the XMPP client configured to communicate with the XMPP server using a BOSH connection with the first platform; wherein the BOSH connection with the first platform is used to establish a continuous connection between the first platform and the second platform and communicate a stream of metadata in XMPP communications from the server application to the client application; and wherein the XMPP communications occurring via the BOSH connection with the first platform are conducted according to an XML stanza providing structured syntax.

In Example 23, the subject matter of Example 22 may optionally include a third platform, wherein the first platform is operable as a proxy to transmit, from the second platform to the third platform, data received via the BOSH connection by the first platform.

In Example 24, the subject matter of one or any combination of Examples 22-23 may optionally include the XMPP communications occurring via the BOSH connection including one or more of: one or more commands configured to control transmission of the stream of metadata to the client application; or one or more application profiles, the application profiles defining capabilities and structured syntax in an XMPP format for the client application.

In Example 25, the subject matter of one or any combination of Examples 22-24 may optionally include the client application being provided by a web application operating in a browser on the second platform, wherein the web application is coded in a browser-renderable markup language compliant with an HTML5 markup language standard, and wherein the XMPP client is provided by a scripting library coded in a scripting language compliant with a JavaScript scripting language standard and executing in the browser.

In Example 26, the subject matter of one or any combination of Examples 22-25 may optionally include the first platform being provided in connection with a television or set top box configured to transmit closed captioning or subtitles in the stream of metadata, and wherein the second platform is provided in connection with a tablet computer configured to receive the stream of metadata.

The Abstract is provided to allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A client device, comprising:
 at least one processor;
 at least one memory device;
 at least one browser;
 at least one scripting library executable in the browser and configured to establish one or more Bidirectional-streams Over Sustained HTTP (BOSH) connections between the client device and a server; and at least one web application executable in the browser and configured to implement the scripting library to receive, using the BOSH connections, one or more XMPP Extensible Messaging and Presence Protocol (XMPP) data transmissions from the server, wherein the XMPP data transmissions provide a stream of metadata from one or more applications operating on the server, the at least one web application further configured to extract keywords from the metadata using natural language processing to obtain contextual information, wherein the stream of metadata is associated with multimedia content processed by the one or more applications, the metadata including text from one or more of closed captioning text or subtitle text of the multimedia content, the metadata for retrieving content supplemental to the multimedia content, wherein the subtitle text is associated with audio of the multimedia content processed by the one or more applications, and wherein the memory device provides a plurality of instructions stored therein, that when executed by the processor, cause the processor to perform instructions that execute the browser, the at least one scripting library, and the at least one web application.

2. The client device of claim 1, the web application further configured to:
transmit, using the BOSH connections, one or more commands from the web application to the server in one or more XMPP command transmissions, the commands used to control transmission of the stream of metadata from the server to the web application.

3. The client device of claim 1, wherein the BOSH connections are established by the browser using a scripting library executed in the web application, the scripting library providing one or more runtime-executed BOSH connection components to the browser.

4. The client device of claim 3, wherein the web application is coded in a browser-renderable markup language compliant with an HTML5 markup language standard, wherein the scripting library is coded in a scripting language compliant with a JavaScript scripting language standard, and wherein the browser graphical user interface is further configured to render web applications coded in a markup language compliant with the HTML5 markup language standard and a scripting language compliant with the JavaScript scripting language standard.

5. The client device of claim 1, the web application further configured to:
exchange with the server, using the BOSH connections, one or more application profiles, the application profiles defining capabilities and structured syntax in an XMPP format for the web application and the application operating on the server.

6. The client device of claim 1, the web application further configured to:
communicate with the server using an XML stanza defined for the web application, the XML stanza providing structured syntax for the XMPP data transmissions with the web application.

7. The client device of claim 1, wherein the multimedia content is being concurrently displayed at the server.

8. The client device of claim 1, the at least one web application further configured to process the stream of metadata and obtain the contextual information about the multimedia content processed by the one or more applications operating on the server.

9. The client device of claim 1, wherein the client device is communicatively coupled to a network, the at least one web application configured to display a user-operable graphical user interface to enable a user to display supplemental information about the multimedia content, in connection with the contextual information obtained from the streamed metadata.

10. The client device of claim 1, wherein the contextual information is about the multimedia content processed by the one or more applications operating on the server, wherein the keywords from the metadata are related to at least one of audio or video content of the multimedia content, title, actor listing, keywords, or content description.

11. A server device, comprising:
at least one processor;
at least one memory device; and
at least one server application for providing a stream of metadata to one or more client applications at a client device, the server application configured to:
establish a Bidirectional-streams Over Sustained HTTP (BOSH) connection between the server application and the client applications; and
transmit, using the BOSH connection, one or more streaming data transmissions from the server application to the client applications, the data transmissions including Extensible Messaging and Presence Protocol (XMPP)-formatted communications providing the stream of metadata,
wherein the memory device provides a plurality of instructions stored therein, that when executed by the processor, cause the processor to perform instructions that execute the server application,
wherein the stream of metadata is associated with multimedia content processed by the server device, the metadata including text from one or more of closed captioning text or subtitle text of the multimedia content, the metadata for retrieving content supplemental to the multimedia content,
wherein the stream of metadata is provided in a format to allow a natural language processor to extract keywords from the stream of metadata to obtain contextual information, and
wherein the subtitle text is associated with audio of the multimedia content processed by the server device.

12. The server device of claim 11, the server application further configured to:
receive, using the BOSH connection, one or more commands from the client applications to the server application in one or more XMPP command transmissions, the commands used to control transmission of the stream of metadata to the client applications.

13. The server device of claim 11, wherein the server application is provided by one or more web applications or web pages executed in connection with a browser, the web applications or web pages using a markup language compliant with an HTML5 markup language standard and a scripting language compliant with a JavaScript scripting language standard.

14. The server device of claim 11, the server application further configured to:
exchange one or more application profiles with the client applications using the BOSH connection, the application profiles defining capabilities and structured syntax in an XMPP format for the server application and the client applications.

15. The server device of claim 11, the server application further configured to:

communicate with the client applications using an XML stanza, the XML stanza providing structured syntax for the XMPP-formatted communications with the client applications.

16. A computer-implemented method for obtaining a stream of metadata from a remote application, comprising:
establishing, at a client device, a Bidirectional-streams Over Sustained HTTP (BOSH) connection between a local web application operating on the client device and a remote application operating on a remote device, the local web application executed within a browser;
receiving, using the BOSH connection, an Extensible Messaging and Presence Protocol (XMPP) streaming data transmission from the remote application, wherein the XMPP streaming data transmission provides metadata from the remote application for use with the local web application;
extracting a keyword from the metadata using natural language processing to obtain contextual information associated with the metadata; and
extracting, within the local web application, a value from the metadata,
wherein the stream of metadata is associated with multimedia content processed by the remote application, the metadata including text from one or more of closed captioning text or subtitle text of the multimedia content, the metadata for retrieving content supplemental to the multimedia content, and
wherein the subtitle text is associated with audio of the multimedia content processed by the remote application on the remote device.

17. The method of claim 16, wherein the BOSH connection is established by the browser through use of a scripting library, the scripting library providing at least one BOSH connection component for runtime execution within the browser.

18. The method of claim 17, wherein the local web application is coded in a browser-renderable markup language compliant with an HTML5 markup language standard, wherein the scripting library is coded in a scripting language compliant with a JavaScript scripting language standard, and wherein the browser is further configured to render web applications coded in a markup language compliant with the HTML5 markup language standard and a scripting language compliant with the JavaScript scripting language standard.

19. The method of claim 16, further comprising:
transmitting, using the BOSH connection, an application profile, the application profile defining capabilities and structured syntax in an XMPP format for the local web application and the remote application;
wherein the XMPP data transmission uses a stanza defined in XML format, the stanza providing structured syntax for the XMPP data transmission with the local web application.

20. The method of claim 16, further comprising:
responsive to user input in a graphical user interface web application, displaying supplemental information associated with the multimedia content and the obtained contextual information.

21. A computer-implemented method for transmitting a stream of metadata to a remote web application, comprising:
establishing, at a server, a Bidirectional-streams Over Sustained HTTP (BOSH) connection between a local application operating at the server and a remote web application, the remote web application executed within a browser;
providing metadata in a format to allow a natural language processor to extract keywords from the metadata to obtain contextual information; and
transmitting from the server, using the BOSH connection, an Extensible Messaging and Presence Protocol (XMPP) streaming data transmission to the remote web application, wherein the XMPP streaming data transmission provides the metadata from the local application to the remote web application,
wherein the stream of metadata is associated with multimedia content processed by the local application, the metadata including text from one or more of closed captioning text or subtitle text of the multimedia content, the metadata for retrieving content supplemental to the multimedia content, and
wherein the subtitle text is associated with audio of the multimedia content processed by the local application.

22. The method of claim 21, wherein the local application is a local web application executed in a local browser and coded in a browser-renderable markup language compliant with an HTML5 markup language standard, wherein the scripting library is coded in a scripting language compliant with a JavaScript scripting language standard, and wherein the local browser is further configured to render web applications coded in a markup language compliant with the HTML5 markup language standard and a scripting language compliant with the JavaScript scripting language standard.

23. The method of claim 21, further comprising:
receiving, using the BOSH connection, an application profile, the application profile defining capabilities and structured syntax in an XMPP format for the local application and the remote web application;
wherein the XMPP data transmission uses a stanza defined in XML format, the stanza providing structured syntax for the XMPP data transmission with the remote web application.

24. A system, comprising:
a first device providing an Extensible Messaging and Presence Protocol (XMPP) server and a server application, the XMPP server configured to communicate using one or more Bidirectional-streams Over Sustained HTTP (BOSH) connections; and
a second device providing an XMPP client and a client application, the XMPP client configured to communicate with the XMPP server using a BOSH connection,
wherein the BOSH connection is used to establish a continuous connection between the first device and the second device and communicate a stream of metadata in XMPP communications from the server application to the client application, the stream of metadata provided in a format to allow a natural language processor communicatively coupled to the second device to extract keywords from the stream of metadata to obtain contextual information,
wherein the XMPP communications occurring via the BOSH connection are conducted according to an XML stanza providing structured syntax,
wherein the stream of metadata is associated with multimedia content processed by the server application, the metadata including text from one or more of closed captioning text or subtitle text of the multimedia content,
wherein the subtitle text is associated with audio of the multimedia content processed by the server application, and wherein the second device retrieves media content that is supplemental to the multimedia content based on the stream of metadata.

25. The system of claim 24, further comprising:
a third device, wherein the first device is operable as a proxy to transmit, from the second device to the third device, data received via the BOSH connection by the first device.

26. The system of claim 24, wherein the XMPP communications occurring via the BOSH connection include one or more of:
one or more commands configured to control transmission of the stream of metadata to the client application; or
one or more application profiles, the application profiles defining capabilities and structured syntax in an XMPP format for the client application.

27. The system of claim 24, wherein the client application is provided by a web application operating in a browser on the second platform, wherein the web application is coded in a browser-renderable markup language compliant with an HTML5 markup language standard, and wherein the XMPP client is provided by a scripting library coded in a scripting language compliant with a JavaScript scripting language standard and executing in the browser.

28. The system of claim 24, wherein the first device is a television or a set top box configured to transmit the closed captioning text or the subtitle text in the stream of metadata, and wherein the second device is a tablet computer configured to receive the stream of metadata.

* * * * *

UNITED STATES PATENT AND TRADEMARK OFFICE
CERTIFICATE OF CORRECTION

PATENT NO. : 9,848,032 B2  
APPLICATION NO. : 13/992420  
DATED : December 19, 2017  
INVENTOR(S) : Staudinger et al.

Page 1 of 1

It is certified that error appears in the above-identified patent and that said Letters Patent is hereby corrected as shown below:

In the Claims

In Column 13, Line 4, in Claim 1, before "Extensible", delete "XMPP"

Signed and Sealed this
Twenty-eighth Day of May, 2019

Andrei Iancu
*Director of the United States Patent and Trademark Office*